United States Patent
Starner et al.

(10) Patent No.: US 10,032,429 B2
(45) Date of Patent: *Jul. 24, 2018

(54) DEVICE CONTROL UTILIZING OPTICAL FLOW

(71) Applicant: Google LLC, Mountain View, CA (US)

(72) Inventors: Thad E. Starner, Mountain View, CA (US); Michael P. Johnson, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,533

(22) Filed: Jan. 4, 2016

(65) Prior Publication Data

US 2016/0118015 A1    Apr. 28, 2016

Related U.S. Application Data

(63) Continuation of application No. 13/729,869, filed on Dec. 28, 2012, now Pat. No. 9,230,501.
(Continued)

(51) Int. Cl.
*G09G 5/00* (2006.01)
*G06F 3/147* (2006.01)
(Continued)

(52) U.S. Cl.
CPC ............. *G09G 5/00* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS

| 5,138,555 A | 8/1992 | Albrecht |
| 5,231,379 A | 7/1993 | Wood et al. |

(Continued)

FOREIGN PATENT DOCUMENTS

| JP | 62157007 | 7/1987 |
| JP | 2005-70308 | 3/2005 |

(Continued)

OTHER PUBLICATIONS

Abdollahian, Golnaz et al., Camera Motion-Based Analysis of User Generated Video, IEEE Transactions on Multimedia, Jan. 2010, vol. 12, No. 1, pp. 28-41.
(Continued)

*Primary Examiner* — Amr Awad
*Assistant Examiner* — Donna Lui
(74) *Attorney, Agent, or Firm* — McDonnell Boehnen Hulbert & Berghoff LLP (57) ABSTRACT

A computing device includes an interface configured to receive image data that is indicative of a field-of-view (FOV) that is associated with a head-mountable display (HMD). The computing device also includes a computing system configured to determine optical flow from the image data and to determine, based on the optical flow, whether or not the HMD is associated with operation of a vehicle. Further, the computing device is configured to control the HMD to display information in a first mode, if the HMD is associated with the operation of the vehicle, and to control the HMD to display information in a second mode, if the HMD is not associated with the operation of the vehicle.

17 Claims, 5 Drawing Sheets

Related U.S. Application Data (60) Provisional application No. 61/584,212, filed on Jan. 6, 2012.

(51) Int. Cl.
*G02B 27/01* (2006.01)
*G06F 1/16* (2006.01)
*G06F 3/01* (2006.01)

(52) U.S. Cl.
CPC ......... *G02B 27/0179* (2013.01); *G06F 1/163* (2013.01); *G06F 3/013* (2013.01); *G06F 3/147* (2013.01); *G02B 2027/014* (2013.01); *G02B 2027/0138* (2013.01); *G02B 2027/0187* (2013.01); *G09G 2340/10* (2013.01); *G09G 2340/12* (2013.01); *G09G 2354/00* (2013.01); *G09G 2380/10* (2013.01)

(56) References Cited

U.S. PATENT DOCUMENTS

| | | | |
|---|---|---|---|
| 5,506,730 A | 4/1996 | Morley et al. | |
| 5,519,410 A | 5/1996 | Smalanskas et al. | |
| 5,579,026 A | 11/1996 | Tabata | |
| 5,635,948 A | 6/1997 | Tonosaki | |
| 6,094,215 A | 7/2000 | Sundahl et al. | |
| 6,654,483 B1 | 11/2003 | Bradski | |
| 6,861,970 B1 | 3/2005 | Garland | |
| 6,919,866 B2 | 7/2005 | Kanevsky et al. | |
| 7,010,332 B1 | 3/2006 | Irvin et al. | |
| 7,030,909 B2 | 4/2006 | Grosvenor et al. | |
| 7,065,242 B2 | 6/2006 | Petrov et al. | |
| 7,103,231 B2 | 9/2006 | Cornog et al. | |
| 7,119,831 B2 | 10/2006 | Ohto et al. | |
| 7,123,215 B2 | 10/2006 | Nakada | |
| 7,167,779 B2 | 1/2007 | Kashiwada et al. | |
| 7,180,476 B1 | 2/2007 | Guell et al. | |
| 7,266,220 B2 | 9/2007 | Sato et al. | |
| 7,286,688 B2 | 10/2007 | Yamamoto et al. | |
| 7,298,907 B2 | 11/2007 | Hasegawa | |
| 7,315,254 B2 | 1/2008 | Smith et al. | |
| 7,327,239 B2 | 2/2008 | Gallant et al. | |
| 7,376,250 B2 | 5/2008 | Higaki et al. | |
| 7,379,566 B2 | 5/2008 | Hildreth | |
| 7,401,918 B2 | 7/2008 | Howell et al. | |
| 7,447,330 B2 | 11/2008 | Yamasaki | |
| 7,474,889 B2 | 1/2009 | Bhakta et al. | |
| 7,481,531 B2 | 1/2009 | Howell et al. | |
| 7,500,746 B1 | 3/2009 | Howell et al. | |
| 7,542,012 B2 | 6/2009 | Kato et al. | |
| 7,581,833 B2 | 9/2009 | Howell et al. | |
| 7,593,757 B2 | 9/2009 | Yamasaki | |
| 7,614,001 B2 | 11/2009 | Abbott et al. | |
| 7,677,723 B2 | 3/2010 | Howell et al. | |
| 7,771,046 B2 | 8/2010 | Howell et al. | |
| 7,783,391 B2 | 8/2010 | Jeong et al. | |
| 7,806,525 B2 | 10/2010 | Howell et al. | |
| 7,809,193 B2 | 10/2010 | Iwasaki et al. | |
| 7,877,686 B2 | 1/2011 | Abbott et al. | |
| 7,922,321 B2 | 4/2011 | Howell et al. | |
| 7,945,297 B2 | 5/2011 | Philipp | |
| 7,987,070 B2 | 7/2011 | Kahn et al. | |
| 8,045,727 B2 | 10/2011 | Philipp | |
| 8,109,629 B2 | 2/2012 | Howell et al. | |
| 8,184,067 B1 | 5/2012 | Braun et al. | |
| 8,212,662 B2 | 7/2012 | Sasaki et al. | |
| 8,335,312 B2 | 12/2012 | Gerhardt et al. | |
| 8,384,617 B2 | 2/2013 | Braun et al. | |
| 8,432,614 B2 | 4/2013 | Amitai | |
| 8,538,009 B2 | 9/2013 | Gerhardt et al. | |
| 8,559,621 B2 | 10/2013 | Gerhardt et al. | |
| 8,692,739 B2 | 4/2014 | Mathieu et al. | |
| 8,825,406 B2 | 9/2014 | Kumon | |
| 8,872,766 B2 | 10/2014 | Moore et al. | |
| 2002/0085843 A1 | 7/2002 | Mann | |
| 2002/0145665 A1 | 10/2002 | Ishikawa et al. | |
| 2003/0071766 A1 | 4/2003 | Hartwell et al. | |
| 2004/0104864 A1 | 6/2004 | Nakada | |
| 2005/0137755 A1 | 6/2005 | Chase et al. | |
| 2006/0103590 A1 | 5/2006 | Divon | |
| 2006/0119539 A1 | 6/2006 | Kato et al. | |
| 2007/0076897 A1 | 4/2007 | Philipp | |
| 2007/0106172 A1 | 5/2007 | Abreu | |
| 2007/0121959 A1 | 5/2007 | Philipp | |
| 2007/0279316 A1 | 12/2007 | Daude et al. | |
| 2007/0281762 A1 | 12/2007 | Barros et al. | |
| 2007/0291232 A1* | 12/2007 | Marshall | A61B 5/16 351/246 |
| 2008/0068559 A1 | 3/2008 | Howell et al. | |
| 2008/0080705 A1 | 4/2008 | Gerhardt et al. | |
| 2008/0140416 A1 | 6/2008 | Shostak | |
| 2008/0169914 A1* | 7/2008 | Albertson | B60W 40/09 340/438 |
| 2008/0239080 A1 | 12/2008 | Moscato | |
| 2009/0055739 A1 | 2/2009 | Murillo et al. | |
| 2009/0234614 A1 | 9/2009 | Kahn et al. | |
| 2009/0315740 A1 | 12/2009 | Hildreth et al. | |
| 2010/0001928 A1 | 1/2010 | Nutaro | |
| 2010/0066832 A1 | 3/2010 | Nagahara et al. | |
| 2010/0079356 A1 | 4/2010 | Hoellwarth | |
| 2010/0149073 A1 | 6/2010 | Chaum et al. | |
| 2010/0157430 A1 | 6/2010 | Hotta et al. | |
| 2010/0164702 A1 | 7/2010 | Sasaki et al. | |
| 2010/0245585 A1 | 9/2010 | Fisher et al. | |
| 2010/0295769 A1 | 11/2010 | Lundstrom | |
| 2010/0323615 A1* | 12/2010 | Vock | H04M 1/60 455/26.1 |
| 2011/0077056 A1 | 3/2011 | Park et al. | |
| 2011/0080289 A1 | 4/2011 | Minton | |
| 2011/0121976 A1 | 5/2011 | Johns et al. | |
| 2011/0125756 A1 | 5/2011 | Spence et al. | |
| 2011/0183601 A1 | 7/2011 | Hannon | |
| 2011/0187547 A1 | 8/2011 | Kweon | |
| 2011/0187844 A1 | 8/2011 | Ogawa et al. | |
| 2011/0231757 A1 | 9/2011 | Haddick et al. | |
| 2011/0241976 A1 | 10/2011 | Boger et al. | |
| 2011/0249122 A1 | 10/2011 | Tricoukes et al. | |
| 2011/0267321 A1 | 11/2011 | Haykawa | |
| 2012/0019641 A1 | 1/2012 | Reeder, III | |
| 2012/0050138 A1 | 3/2012 | Sato et al. | |
| 2012/0075168 A1 | 3/2012 | Osterhout et al. | |
| 2012/0075170 A1 | 3/2012 | Watson et al. | |
| 2012/0086625 A1 | 4/2012 | Takeda et al. | |
| 2012/0139816 A1 | 7/2012 | King et al. | |
| 2012/0206322 A1 | 8/2012 | Osterhout et al. | |
| 2012/0235805 A1 | 9/2012 | Nogami et al. | |
| 2012/0235902 A1 | 9/2012 | Eisenhardt et al. | |
| 2012/0287040 A1 | 11/2012 | Moore et al. | |
| 2013/0021225 A1 | 1/2013 | Braun et al. | |
| 2013/0021373 A1 | 1/2013 | Vaught et al. | |
| 2013/0044129 A1 | 2/2013 | Latta et al. | |
| 2013/0063336 A1 | 3/2013 | Sugimoto et al. | |
| 2013/0093788 A1 | 4/2013 | Liu et al. | |
| 2013/0095894 A1 | 4/2013 | Gerhardt et al. | |
| 2013/0120449 A1 | 5/2013 | Ihara et al. | |
| 2013/0147686 A1 | 6/2013 | Clavin et al. | |
| 2013/0154906 A1 | 6/2013 | Braun et al. | |
| 2013/0210497 A1 | 8/2013 | Gerhardt et al. | |
| 2013/0314303 A1 | 11/2013 | Osterhout et al. | |
| 2013/0335301 A1 | 12/2013 | Wong et al. | |

FOREIGN PATENT DOCUMENTS

| | | |
|---|---|---|
| JP | 2005-72867 | 3/2005 |
| WO | 2001/061672 | 8/2001 |

OTHER PUBLICATIONS

Arbel, Tal et al., Recognizing Objects from Curvilinear Motion, BMVC 2000, McGill University, Center for Intelligent Machines, Montreal, Quebec, Canada.

Funkhouser, Thomas et al., A Search Engine for 3D Models, NEC Research Institute, ACM Transations on Graphics, vol. V., No. N.

(56) References Cited

OTHER PUBLICATIONS

Cheatle, Phil, Media Content and Type Selection from Always-on Wearable Video, Proceedings of the 17th International Conference on Pattern Recognition, ICPR '04, IEEE Computer Society.
Starner, Thad, Augmented Reality Through Wearable Computing, M.I.T Media Laboratory Perceptual Computing Section Technical Report No. 397, Massachusetts Institute of Technology, 1997, pp. 1-9.
Nakamura, Yuichi, et al., Structuring Personal Experiences Analyzing Views from a Head-Mounted Camera, Institute of Engineering Mechanics and Systems, University of Tsukuba, Japan.
Lucas, Bruce D., et al., An Iterative Image Registration Techinque with an Application to Stereo Vision, Proceedings of Imaging Understanding Workshop, Computer Science Dept., Carnegie-Mellon University, 1981, pp. 121-130.
Wither, Jason, et al., Pictorial Depth Cues for Outdoor Augmented Reality, University of California, Santa Barbara, California.
Salvucci, et al., "The time course of a lane change: Driver control and eye-movement behavior", Transportation Research Part F 5, pp. 123-132 (Mar. 2002).
Pentland et al., "Modeling and Prediction of Human Behavior", Neural Computation (Massachusetts Institute of Technology) vol. 11, pp. 229-242 (Nov. 1999).
Cakmakci, O., et al., "Head-Worn Displays: A Review," Journal of Display Technogoy, vol. 2, pp. 199-216, 2006.

\* cited by examiner

DEVICE CONTROL UTILIZING OPTICAL FLOW

CROSS REFERENCE TO RELATED APPLICATIONS

The present application is a continuation of U.S. patent application Ser. No. 13/729,869, filed on Dec. 28, 2012, which claims priority to U.S. Provisional Application No. 61/584,212 filed on Jan. 6, 2012, each of which is incorporated herein by reference in its entirety.

BACKGROUND

Computing devices such as personal computers, laptop computers, tablet computers, cellular phones, body-mountable or wearable computers, and other types of devices are increasingly prevalent in numerous aspects of modern life. Generally, a computing device can be configured to display or otherwise provide information to a user and to facilitate user interaction with the provided information and the computing device.

The present disclosure generally relates to systems, methods, program instructions, etc., for controlling a computing device to provide information to a user and to facilitate user interaction with the provided information and the computing device while the user is engaged in different activities.

SUMMARY

According to one example, a computing device includes an interface configured to receive image data that is indicative of a field-of-view (FOV) that is associated with a head-mountable display (HMD). The computing device also includes a computing system configured to determine optical flow from the image data and to determine, based on the optical flow, whether or not the HMD is associated with operation of a vehicle. Further, the computing device is configured to control the HMD to display information in a first mode, if the HMD is associated with the operation of the vehicle, and to control the HMD to display information in a second mode, if the HMD is not associated with the operation of the vehicle.

According to another example, a computer-implemented method includes receiving image data that is indicative of a field of view (FOV) that is associated with a head-mountable display (HMD), processing the image data to determine an optical flow, identifying an activity from the optical flow, and controlling the HMD in response to the identified activity.

According to a further example, a wearable computing device includes a display, an imaging device, and a computing system coupled to the display and the imaging device. The computing system is configured to process image data captured by the imaging device to determine optical flow, to identify an activity from the optical flow, and to control the display to display information in response to the identified activity.

DETAILED DESCRIPTION

I. Overview

The present disclosure describes examples of a computing or display device that controls a display element to display a user interface including information, such as text, images, video, etc., viewable by a user. In one example, a computing device can be configured as an augmented-reality device that displays a user interface that is blended or overlaid with the user's field of view (FOV) of a real-world environment. Such a computing device can be a wearable computing device, which is commonly referred to as a near-eye display, head-mountable display (HMD), or heads-up display (HUD). Generally, a wearable computing device has a display element configured to be disposed near the user's eye such that the user interface displayed by the display element overlays part or all of the FOV of the user. The displayed user interface may supplement the user's FOV of the physical world with useful information related to the user's FOV.

The computing device may also receive data relating to the user's environment as the user is engaged in different activities. The computing device can utilize such data to responsively provide a user interface that is appropriate or assistive for an activity in which the user is engaged. For instance, the user may be sitting, standing, walking, running, or operating a vehicle and the computing device can be configured to adjust the user interface in accordance with different display modes associated with the activity engaged in by the user.

In one non-limiting example, a wearable computing device includes a camera that is configured to capture images or image data of a FOV of the wearable computing device. When the wearable computing device is worn by a user, these FOV images may also correspond to the FOV of the user. These user FOV images can be processed to detect optical flow that is characteristic of different activities engaged in by the user. For example, the FOV images can be processed to detect an optical flow that is characteristic of the user operating a vehicle. In response, the wearable computing device can be controlled to provide a user interface that is assistive for operating a vehicle, such as by minimizing or eliminating portions of the user interface so as to not obstruct the FOV of the user, providing audible messages instead of text messages, sending phone calls directly to voicemail, and so on.

II. Illustrative Wearable Computing Devices

Figure 1:
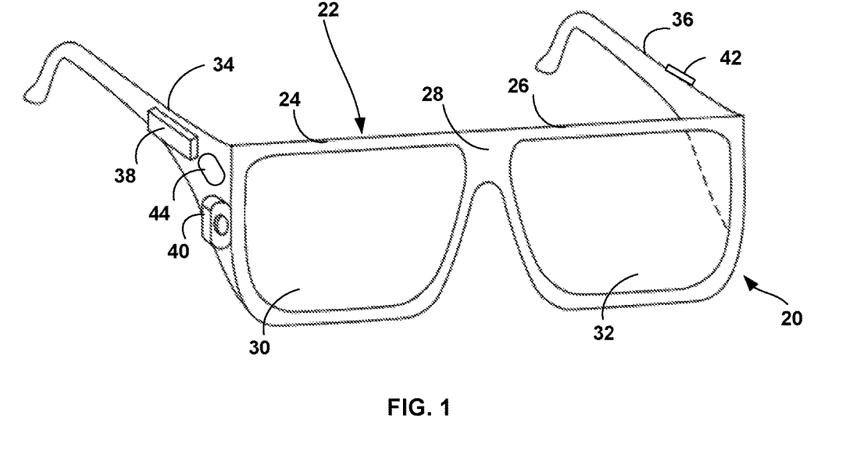
FIG. 1 is a generally front isometric view of a system capable of receiving, transmitting, and/or displaying data, in accordance with one example.

Referring now to FIG. 1, a non-limiting example of a wearable computing device 20 including an HMD 22 is shown. As illustrated in FIG. 1, the HMD 22 comprises frame elements, including lens frames 24, 26 and a center frame support 28, lens elements 30, 32, and extending side or support arms 34, 36. The center frame support 28 and the side arms 34, 36 are configured to secure the HMD 22 to a user's face via the user's nose and ears, respectively.

Each of the frame elements 24-28 and the side arms 34, 36 may be formed of a solid structure of plastic and/or metal, or may be formed of a hollow structure of similar material so as to allow wiring and component interconnections to be internally routed through the HMD 22. Other materials and designs may be possible as well.

One or more of the lens elements 30, 32 may be formed of any material that can suitably display a projected image or graphic. In one example, each of the lens elements 30, 32 are also sufficiently transparent to allow a user to see through the lens element. Combining these two features of the lens elements may facilitate an augmented reality display where a projected image or graphic is superimposed over a real-world view as perceived by the user through the lens elements 30, 32 so that the user can view the projected image and the real world simultaneously.

The side arms 34, 36 may each be projections that extend away from the lens frames 24, 26, respectively, and may be positioned behind a user's ears to help secure the HMD 22 to the user. The side arms 34, 36 may further secure the HMD 22 to the user by extending around a rear portion of the user's head. Additionally or alternatively, for example, the device 20 may connect to or be affixed within a head-mounted helmet structure. Other possibilities exist as well.

The device 20 may also include an on-board computing system 38, an imaging device 40 (e.g., a still camera or a video camera), a sensor 42, and a finger-operable touch pad 44. The computing system 38 is shown to be positioned on the side arm 34 of the HMD 22 in FIG. 1. However, in other examples, the computing system 38 may be provided on other parts of the HMD 22 or may be positioned remotely from the HMD, for example, the computing system 38 can be coupled via a wired or wireless link to the HMD. As such, the computing system 38 may include a suitable communication interface to facilitate such wired or wireless links. The computing system 38 may include a processor and memory, for example. The computing system 38 may be configured to receive and analyze data from the video camera 40 and the touch pad 44 and to generate images for output by or on the lens elements 30, 32. In other examples, the computing system 38 may be configured to receive and analyze data from other sensory devices, user interfaces, or both.

In FIG. 1, the video camera 40 is shown positioned on the side arm 34 of the HMD 22. However, in other examples, the video camera 40 may be provided on other parts of the HMD 22. The video camera 40 may be configured to capture images at any resolution or frame rate. Many types of video cameras with a small form-factor, such as those used in cell phones or webcams, for example, may be incorporated into various embodiments of the device 20.

Further, although FIG. 1 illustrates one video camera 40, more video cameras may be used and each camera may be configured to capture the same view or to capture different views. For example, the video camera 40 may be forward facing to capture at least a portion of the real-world view perceived by the user. Such forward facing image captured by the video camera 40 may then be used to generate an augmented reality where computer generated images relate to the FOV of the user.

The sensor 42 is shown on the side arm 36 of the HMD 22. However, in other examples, the sensor 42 may be positioned on other parts of the HMD 22. The sensor 42 may include one or more components for sensing movement, such as one or more of a gyroscope, accelerometer, compass, and global positioning system (GPS) sensor, for example. Further, the sensor 42 may include optical components such as an emitter and a photosensor for tracking movement of a user's eye, which can, in turn, be used to track a gaze of the user. In other examples, the sensor 42 may include other components to detect a general arousal level of the user, such as components for monitoring a heart rate, blood pressure, galvanic skin response, etc. of the user. Other sensing devices may be included within or in addition to the sensor 42 and other sensing functions may be performed by the sensor.

The touch pad 44 is shown on the side arm 34 of the HMD 22. However, in other examples, the touch pad 44 may be positioned on other parts of the HMD 22. Further, more than one touch pad may be present on the HMD 22. Generally, the touch pad 44 may be used by a user to provide inputs to the device 22. The touch pad 44 may sense at least one of a position and a movement of a finger via capacitive sensing, resistance sensing, or a surface acoustic wave process, among other possibilities. The touch pad 44 may be capable of sensing finger movement in a direction parallel or planar to the pad surface, in a direction normal to the pad surface, or both, and may also be capable of sensing a level of pressure applied to the pad surface. The touch pad 44 may be formed of one or more translucent or transparent insulating layers and one or more translucent or transparent conducting layers. Edges of the touch pad 44 may be formed to have a raised, indented, or roughened surface, so as to provide tactile feedback to a user when the user's finger reaches the edge, or other area, of the touch pad. If more than one touch pad is present, each touch pad may be operated independently, and may provide a different function.

Figure 2:
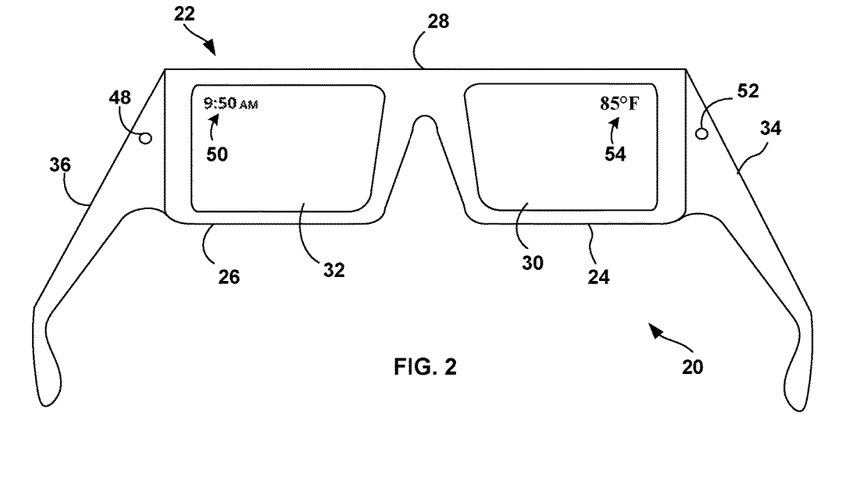
FIG. 2 is a generally back isometric view of the system of FIG. 1.

FIG. 2 illustrates an alternate view of the device 20 illustrated in FIG. 1. As shown generally in FIG. 2, the lens elements 30, 32 may act as display elements. The HMD 22 may include a first optical element 48 coupled to an inside surface of the side arm 36 and configured to produce a display 50 onto an inside surface of the lens element 32. Additionally or alternatively, a second optical element 52 may be coupled to an inside surface of the side arm 34 and configured to project a display 54 onto an inside surface of the lens element 30. The first and second optical elements 48, 52 can also be configured to image one or more of the user's eyes to track the gaze of the user.

The lens elements 30, 32 may act as a combiner in a light projection system and may include a coating that reflects the light projected onto them from the projectors 48, 52. In some embodiments, a reflective coating may not be used, for example, when the projectors 48, 52 are scanning laser devices.

In alternative embodiments, other types of display elements may also be used. For example, the lens elements 30, 32 may include a transparent or semi-transparent matrix display, such as an electroluminescent display or a liquid crystal display, one or more waveguides for delivering an image to the user's eyes, and/or other optical elements capable of delivering an in-focus near-to-eye image to the user. A corresponding display driver may be disposed within or otherwise coupled to the frame elements 24-28, for example, for driving such a matrix display. Alternatively or additionally, a laser or LED source and scanning system can be used to draw a raster display directly onto the retina of one or more of the user's eyes. Other possibilities exist as well.

Figure 3:
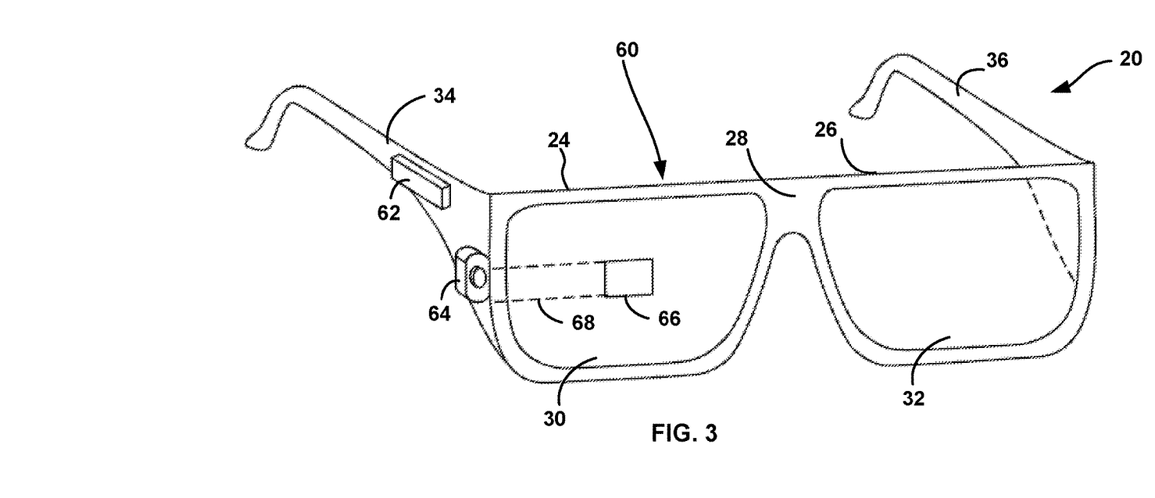
FIG. 3 a generally front isometric view of another system capable of receiving, transmitting, and/or displaying data, similar to the system of FIG. 1.

FIG. 3 illustrates another example wearable computing device 20 for receiving, transmitting, and/or displaying data in the form of an HMD 60. Like the HMD 22 of FIGS. 1 and 2, the HMD 60 may include frame elements 24-28 and side arms 32, 34. Further, the HMD 60 may include an on-board computing system 62 and a video camera 64, similarly to the HMD 22. The video camera 64 is shown mounted on the side arm 34 of the HMD 60. However, in other examples, the video camera 64 may be mounted at other positions as well.

The HMD 60 illustrated in FIG. 3 also includes a display 66, which may be coupled to the device in any suitable manner. The display 66 may be formed on a lens element of the HMD 60, for example, on the lens elements 30, 32, as described with respect to FIGS. 1 and 2, and may be configured to display computer-generated graphics overlaid on the user's view of the physical world. The display 66 is shown to be provided generally in a center of the lens 30 of the computing device 60. However, in other examples, the display 66 may be provided in other positions. In the present example, the display 66 can be controlled by the computing system 62 that is coupled to the display via an optical waveguide 68.

Figure 4:
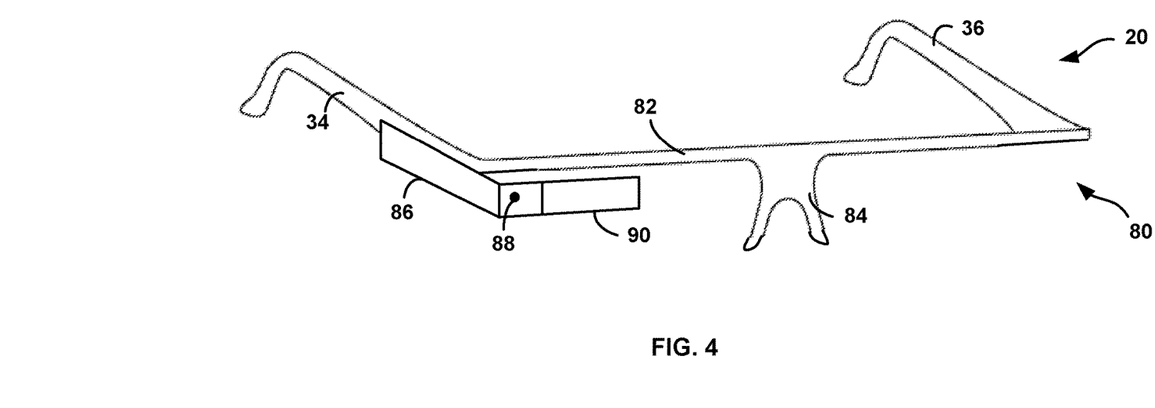
FIG. 4 a generally front, isometric view of another system capable of receiving, transmitting, and/or displaying data, similar to the system of FIG. 1.

FIG. 4 illustrates another example wearable computing device 20 for receiving, transmitting, and displaying data in the form of an HMD 80. Similarly to the HMD 22 of FIGS. 1 and 2, the HMD 80 may include side-arms 34, 36, a center frame support 82, and a bridge portion with nosepiece 84. In the example shown in FIG. 4, the center frame support 82 connects the side-arms 34, 36. The HMD 80 may additionally include an on-board computing system 86 and a video camera 88, similar to those described with respect to FIGS. 1 and 2.

The HMD 80 may include a lens element 90 that may be coupled to one of the side-arms 34, 36 or the center frame support 82. The lens element 90 may be configured to display computer-generated graphics overlaid on the user's view of the physical world. In one example, the lens element 90 may be coupled to an inner side of the side arm 34 that is exposed to a portion of a user's head when the HMD 80 is worn by the user. The lens element 90 may be positioned in front of or proximate to a user's eye when the HMD 80 is worn by a user. For example, the lens element 90 may be positioned below the center frame support 82, as shown in FIG. 4.

III. Example Computing Network Infrastructure

Figure 5:
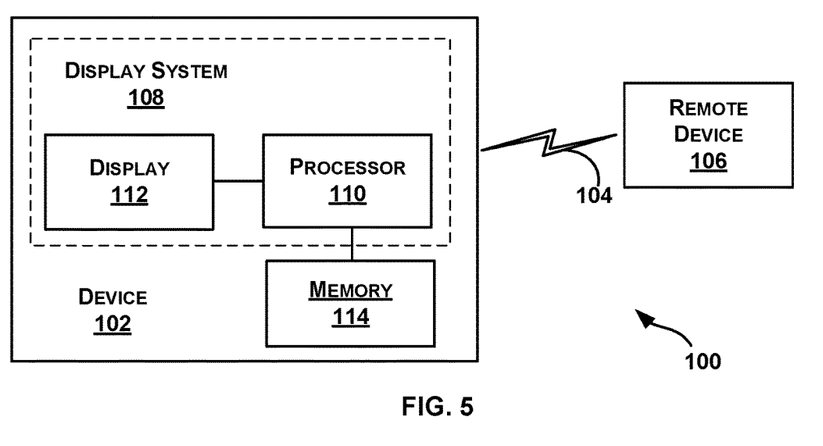
FIG. 5 is a block diagram of a computer network infrastructure, in accordance with one example.

FIG. 5 illustrates a schematic drawing of an example computer network infrastructure system 100. In the system 100, a device 102 communicates through a communication link 104, which can be a wired and/or wireless connection, to a remote device 106. The device 102 may be any type of device that can receive data and display information corresponding to or associated with the data. For example, the device 102 may be a wearable computing device 20, as described with respect to FIGS. 1-4.

Thus, the device 102 may include a display system 108 with a processor 110 and a display element 112. The display element 112 may be, for example, an optical see-through display, an optical see-around display, or a video see-through display. The processor 110 may receive data from the remote device 106 and configure the data for display on the display element 112. The processor 110 may be any type of processor, such as a micro-processor or a digital signal processor, for example.

The device 102 may further include on-board data storage, such as memory 114 coupled to the processor 110. The memory 114 may store software that can be accessed and executed by the processor 110, for example.

The remote device 106 may be any type of computing device or transmitter including a laptop computer, a mobile telephone, tablet computing device, a server device, etc., that is configured to transmit data to the device 102 or otherwise communicate with the device 102. The remote device 106 and the device 102 may contain hardware and software to enable the communication link 104, such as processors, transmitters, receivers, antennas, program instructions, etc.

In FIG. 5, the communication link 104 is illustrated as a wireless connection. However, in other examples wired connections may also be used. For example, the communication link 104 may be a wired serial bus, such as a universal serial bus or a parallel bus. A wired connection may be a proprietary connection as well. The communication link 104 may also be a wireless connection using, for example, Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 106 may be accessible via the Internet and may include a computing cluster associated with a particular web service, for example, social-networking, photo sharing, address book, etc.

IV. Examples of Controlling a Computing Device Based on a User Activity

Generally, an individual can use computing devices, such as the wearable computing device 20 of FIGS. 1-4, while engaged in a variety of activities. In the present disclosure, the wearable computing device 20 can receive data relating to the user's environment to identify such activities and to adjust a user interface or otherwise control the device in accordance with an activity engaged in by the individual.

In one example, the wearable computing device 20 can be used to determine that the user of the computing device is operating a vehicle, such as a car, motorcycle, bicycle, train, plane, etc., and to provide a user interface that is assistive for operating the vehicle. For instance, the camera 40 can obtain a series of images or video frames of a user's FOV. This FOV image data can be processed to determine an optical flow of the user's FOV and the optical flow can be analyzed to determine whether the optical flow is characteristic of operating a vehicle. For example, FOV image data can be processed to determine an optical flow field 150 characteristic of moving forward rapidly, as shown illustratively in FIG. 6.

Generally, optical flow of a series of images or video frames relates to a measurement of apparent motion of pixels in the image data that results from relative movement between objects in the images and the camera. Many techniques for analyzing optical flow can be used in the present disclosure, such techniques include, for example, (i) phase correlation, (ii) block-based methods, (iii) differential methods such as the Lucas-Kanade optical flow method, the Horn-Schunk method, the Buxton-Buxton method, and the Black Jepson method, and (iv) discrete optimization methods, among others.

Figure 6:
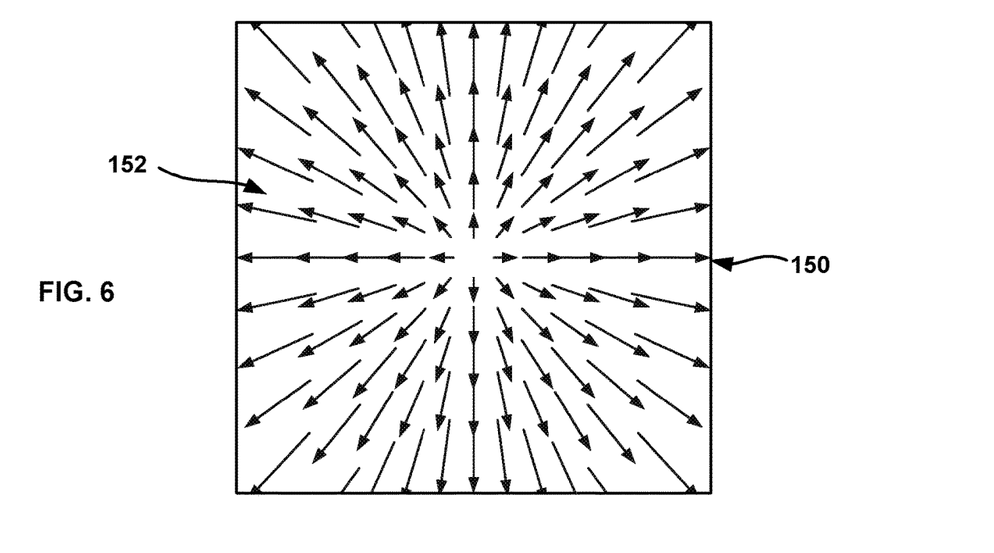
FIG. 6 is an example of image data that represents an optical flow characteristic of moving forward rapidly.

More particularly, the optical flow field 150 and optical flow vectors 152, illustrated in FIG. 6 may represent objects in the foreground and background of the image data moving past the camera at a rate of speed consistent with being inside a moving vehicle. The optical flow vectors 152 correspond to sample points, which may represent objects in the image data, and indicate a magnitude and direction of the optical flow that is determined from each sample point. As seen in the optical flow field 150 of FIG. 6, an optical flow field representative of operating a vehicle may include optical flow vectors 152 that appear to generally originate from a focal point of the flow field and extend out radially from the focal point with increasing magnitudes.

More particularly, in one example, the wearable computing device 20 can process the optical flow field 150 to determine that the user is operating a vehicle by identifying optical flow vectors 152 that have magnitudes above a noise level. These optical flow vectors 152 can be determined by processing static FOV images and identifying optical flow vectors with magnitudes that are about two (2) or more standard deviations above a noise level associated with the static FOV images. The computing device 20 can then form lines through these identified optical flow vectors 152 and draw a circle with a given radius (e.g., a radius of about 25% of a width of the static images) over the optical flow field 150. If the circle can be placed over the optical flow field 150 at a position where a majority of the lines through the identified optical flow vectors 152 intersect, then the computing device 20 can determine that the user is moving forward (or backward depending on the direction of the flow vectors). The optical flow field 150 of FIG. 6 is one example where such a circle can be drawn to determine that the user is moving forward. Further, based on the magnitudes of the optical flow vectors 152, the computing device 20 can determine a speed at which the user is moving. These movement and speed determinations can further be used to determine whether the user is operating a vehicle.

Generally, the processing of the optical flow field 150, in accordance with the above or other examples, can be performed while the wearable computing device 20 is not rotating substantially with respect to a user of the computing device. This is because the rotation of the wearable computing device 20 can result in optical flow vectors that are characteristic of the rotation of the device with respect to the user, instead of being characteristic of the movement of the user with respect to the environment. For example, if the wearable computing device 20 is rotated to the left, then an otherwise static FOV will include optical flow vectors that indicate a movement to the right due to the rotation. The rotation of the wearable computing device 20 can be determined by processing outputs from a gyroscope of the computing device. If the rotation of the computing device 20 exceeds a given threshold, then the device may suspend further processing of the optical flow.

However, in one example, the computing device 20 can use various techniques to compensate for rotation of the device and process an optical flow field even while the device is rotating. One illustrative technique to compensate for this rotation is to measure the rotational angular velocity of the computing device 20 and to model a predicted optical flow contribution based on the angular velocity. The predicted optical flow contribution can then be removed from an optical flow field using a vector sum of a calculated optical flow field and an anticipated optical flow field. Other examples are also possible.

The optical flow field 150 and the optical flow vectors 152 are simplified in the present example to illustrate the optical flow of sample points that are all moving relatively constantly with respect to the FOV and a focal point of the camera positioned around a center of the optical flow field. Such a simplified optical flow field 150 represents movement of the camera directly toward the focal point, which is located around the center of the FOV in the present example.

However, in practice, optical flow vectors for different points throughout an optical flow field may be directed in different directions and have different magnitudes depending on a variety of factors, including geometry of objects represented by the points, relative movement between these objects and the camera, a direction of movement toward or away different objects, the focal point of the FOV, etc. For example, portions of the image data along a focal point and generally below a horizon line of the FOV may include a roadway and, consequently, the optical flow vectors of such portions may be arranged in a relatively predictable pattern toward the camera when the image data is associated with operation and movement of a vehicle (as illustrated for example in the bottom portion of the flow field 150). However, the introduction of other objects, such as cars moving along the roadway, stationary objects at sides of the roadway, clouds in the sky, etc., will cause the optical flow field to be more complex than the simplified fields illustrated in the example of FIG. 6.

Figure 7:
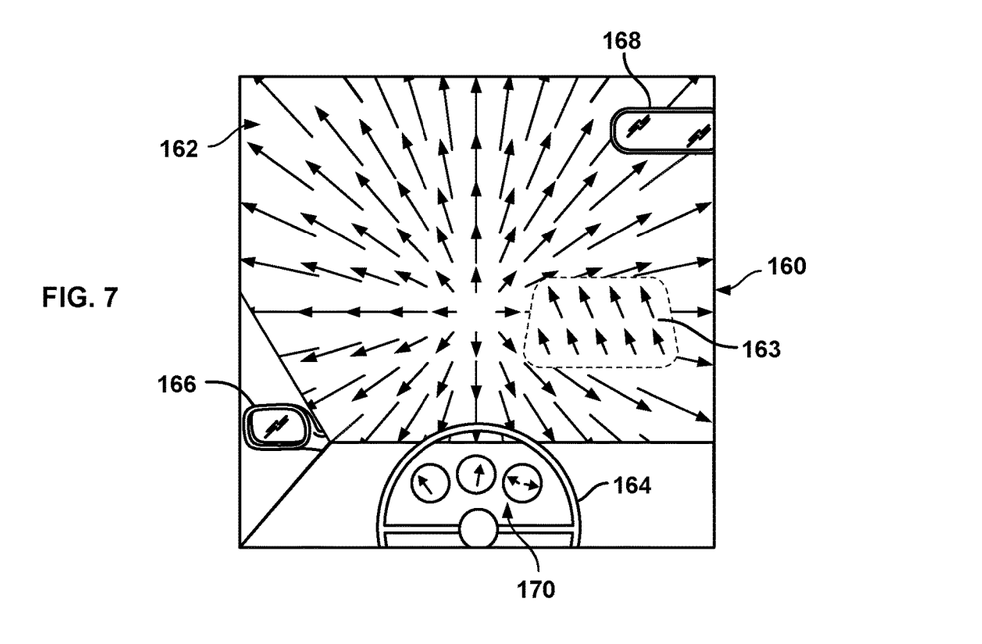
FIG. 7 is an example of image data that represents an optical flow characteristic of a user operating a vehicle.

Referring to FIG. 7, another example of an optical flow field 160 with optical flow vectors 162 is illustrated. The optical flow field 160 of FIG. 7 is similar to the optical flow field 150 of FIG. 6 but includes additional characteristics that can be analyzed to identify an activity engaged in by a user. More particularly, in the example of FIG. 7, the optical flow field 160 is representative of the FOV of a user operating a vehicle. As such, portions of the optical flow 160 that correspond to the vehicle operated by the user, e.g., portions of the dash and a rear-view mirror, have substantially zero velocities relative to the user's FOV and, thus, there are no optical flow vectors 152 illustrated in these portions of the optical flow. This type of optical flow pattern with an area around a dashboard of the vehicle having low optical flow (close to a noise level) adjacent an area of high optical flow can be identified and used to determine that the user is operating a vehicle.

FIG. 7 also illustrates a group of similar optical flow vectors 163 that are distinguishable from the relatively fast moving flow vectors 162. Generally, transitions between different groupings of similar flow vectors can be used to determine outlines of particular objects. In this example, the group of optical flow vectors 162 represents another vehicle moving along a roadway with the user's vehicle. The vehicle represented by the flow vectors 162 is in front and slightly to the right (perhaps one lane to the right) of the user's vehicle and is moving away from the user's vehicle at a relatively low rate. These characteristics of the vehicle represented by the group of flow vectors 162 can be determined by analyzing the size and shape of the group (e.g., a decreasing size of the group may indicate an object moving away from the user) and by analyzing the magnitude and direction of the optical flow vectors.

Generally, groups of optical flow vectors that represent objects in the user's FOV can be analyzed to determine various characteristics of the objects. For example, a size and shape of the group can be used to determine a general identity of the object, magnitude and direction of the optical flow vectors can be used to determine a relative speed and heading of the object, movement of the group within the FOV can also be used to determine a relative speed and heading of the object, and a changing size of the group can be used to determine whether the object is moving toward or away from the user.

Image data of the user's FOV may also be processed to identify other features or characteristics indicative of a user operating a vehicle. Referring still to FIG. 7, various other features or characteristics of the image data are overlaid over the optical flow field 160. In the present example, such features or characteristics can be indicative of a user operating a vehicle and may include, for example, vehicle steering or operating components, such as a steering wheel 164, handlebar, joystick, gear shifter, hand brake, side-view mirror 166, rear-view mirror 168, gauges or meters 170, etc., positioned around a user's FOV in an arrangement consistent with the user being located at a position to operate the vehicle, as shown illustratively in FIG. 7. In other examples, these and other features and characteristics of the image data can be analyzed to determine where in the vehicle the user is positioned, e.g., in a front or back seat of a car and/or on a left or right side of the car. Accordingly, these features or characteristics of the FOV image data can be used to distinguish between a passenger in a moving vehicle and an operator of the moving vehicle. For example, the optical flow field 150 in FIG. 6 could be characteristic of a passenger or an operator of the vehicle. However, the other features or characteristics illustrated in FIG. 7, for example, can be used to distinguish between a passenger and an operator. Generally, the other features or characteristics can be identified in the FOV image data using known object recognition techniques, for example.

FOV image data can also be processed to identify changes in the FOV that are characteristic of the user operating a vehicle, for example, a FOV that pans towards an adjacent lane or a cross street before and/or during a lane change or turn. Other image processing examples are also possible.

As discussed above, the computing device 20 may also be in communication with other sensors, such as an accelerometer, a compass, a gyroscope, a global positioning system (GPS), eye-movement or gaze tracking cameras or sensors, heart rate and/or blood pressure monitors, a galvanic skin response sensor, etc. Output from such sensors can be used to detect movement data related to the computing device and the user and the movement data can be used to determine that the user is located in a moving vehicle.

Output from such sensors can also be used to determine or corroborate a determination that the user is operating a vehicle as opposed to being a passenger in the vehicle. For example, GPS or other positioning data can be used to estimate where a user is positioned relative to the vehicle in order to distinguish between a passenger and an operator of the vehicle. In another example, gaze tracking sensors can be used to identify characteristics of the user's gaze that are indicative of operating a vehicle. For example, if the user is an operator of the vehicle, gaze tracking sensors can determine that a user's gaze is focusing on road conditions and periodically at side and/or rear-view mirrors or at portions of the user's FOV that would be expected to include such mirrors. Alternatively or in conjunction, if the user is an operator of the vehicle, gaze tracking sensors can determine that a user's gaze is focusing periodically on a speedometer and/or other navigation systems or at portions of the user's FOV that would be expected to include such systems. In contrast, if the user is merely a passenger, gaze tracking sensors can determine that the user's gaze is not focused on road conditions or navigations systems but, rather, is periodically focused on another passenger/operator in the vehicle, at a radio console, out a side window, on a mobile device, etc.

Output from such sensors can also be used to determine a general arousal level of the user. The arousal level can be correlated to a general attention level requirement of a given activity or sub-states of a given activity. For example, a high arousal level can correlate to a high-attention situation, such as stop-and-go traffic or highway merging/exiting. Further, a low arousal level can correlate to a low-attention situation, such as driving on a long stretch of deserted country highway.

The above examples of image and other sensor data processing can be used individually or in combination to determine that a user is operating a vehicle. Other sensor data processing examples are also possible.

Further, the above examples of image data and/or other sensor data processing can be used individually or in combination to determine sub-states of an activity. Generally, activities can be divided into any number of sub-states, which in turn can be divided into additional sub-states, and so on. In some embodiments, different activities and sub-states thereof can be organized in a hierarchical structure or organized in any other useful arrangement.

In various examples, sub-states of operating a vehicle can be determined, such as merging with traffic, exiting on an off-ramp, turning, driving in heavy traffic, parking, etc. Illustratively, images of the user's FOV can be processed to identify an optical flow indicative of stop-and-go traffic, which, in turn, may be used to determine that the user is operating a vehicle in a heavy traffic situation. For example, an optical flow field representing the user's FOV can be analyzed to identify groups of similar optical flow vectors that represent other vehicles, as described above. Illustratively, a consistent high speed flow field with few groups of optical flow vectors representing other vehicles can be used to infer driving on a highway with low traffic. Higher traffic situations can be characterized by a greater number of groups of optical flow vectors representing other vehicles. In another example, groups of optical flow vectors representing other vehicles that also include low magnitude optical flow vectors may characterize stop-and-go or dense traffic.

In the present example, other sensor data, such as GPS sensor data or arousal level data, can be used to corroborate the determination that the user is operating a vehicle in heavy stop-and-go traffic.

After determining that the user of the computing device is operating a vehicle, the computing device may select a user interface that is appropriate or assistive for operating the vehicle. Generally, the user interface of the computing device may include an arrangement of displayed information and other elements that allow the user to interact with the computing device. A given user interface may be appropriate for a first activity while being inappropriate (or less appropriate or assistive) for a second user activity. In an example, an appropriate user interface for operating a vehicle may include a user interface that serves to assist the user with the activity, for instance, the user interface may include a map to assist the user in navigation. As another example, the user interface for operating a vehicle includes a user interface that allows the user to focus on operating the vehicle, for example, the user interface may be an interface that minimizes or eliminates distractions to the user. Illustratively, the user interface may be made generally transparent, minimized in content or detail, or removed entirely.

In addition, the user interface may be further modified depending on a sub-state of an activity. For example, in a high-attention situation, such as stop-and-go traffic or highway merging/exiting, only important blind-spot information, for example, can be displayed. In another example, in a low-attention situation, such as driving on a deserted country highway, longer term data can be displayed, including, for example, navigation and fuel stopping points.

As yet another example, the user interface may include communication settings and/or internet settings that are appropriate or assistive for a person operating a vehicle. As an example, appropriate communication settings may include settings that disable text messaging, send incoming phone calls directly to voicemail, and prevent at least some outgoing and incoming phone calls, such as calls aside from emergency phone calls. Appropriate internet settings may include disabling internet applications that would require active input from the user. Other communication settings and internet settings appropriate for operating a vehicle are possible as well.

In various examples, a user can be asked to confirm or authorize modifications to the user interface. Alternatively, modifications to the user interface can be made autonomously in response to detecting an activity or sub-state of an activity with a user override option. Likewise, modifications to communication and/or internet settings can be made based on user confirmation or can be made autonomously with a user override option. Generally, various aspects of user interfaces and other device settings associated with different activities and sub-states of an activity can be customized by a user, as desired.

The above examples have generally related to operating a vehicle, however, the present disclosure can also be utilized to identify other activities engaged in by a user. For example, optical flow, features or characteristics in FOV images, and sensor data can be analyzed to determine that the user is riding a bicycle. Generally, an optical flow associated with riding a bicycle is characterized by moving forward faster than if the user were to be walking but slower than if the user were to be operating a motorized vehicle. Further, the optical flow associated with riding a bicycle would generally not vary as much vertically as compared to walking or running, which may result in noticeable up and down movement in the user's FOV.

In fact, in one embodiment, an up and down cadence associated with running may characterize an optical flow associated with this activity. The frequency of up and down movement in the optical flow field can be processed to identify the cadence associated with running.

In another example, the user may be engaged in an activity of viewing a monitor (e.g., computer, television, movie screen). In this example, an optical flow associated with this activity can be characterized by a FOV focused on a rectangular shape, which would be typical of the monitor, very low optical flow magnitudes outside of and around the rectangular shape, and a relatively noisy optical flow inside the rectangular shape.

Figure 8:
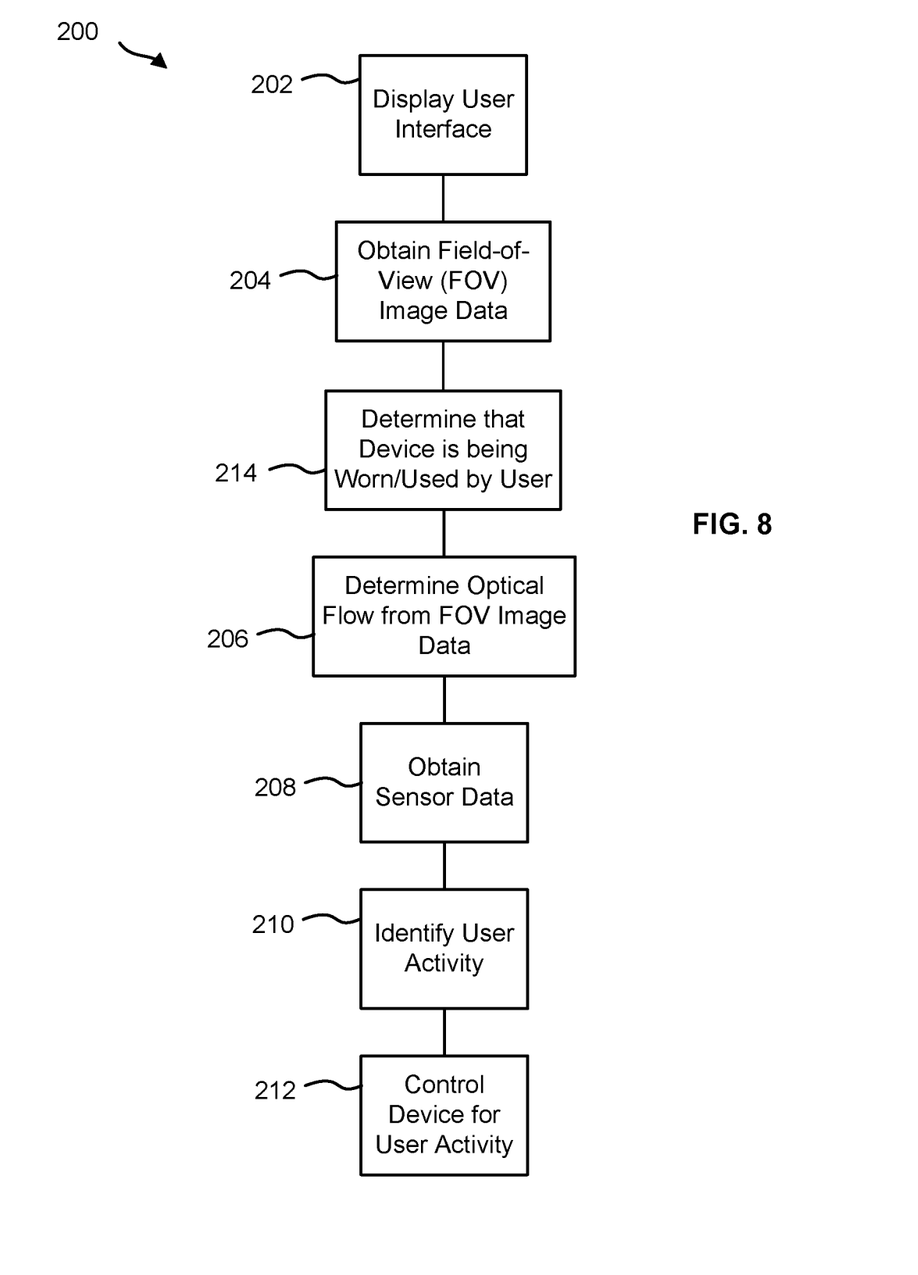
FIG. 8 is a flowchart that represents processes of an example method for controlling a computing device.

FIG. 8 is a flowchart depicting a method 200 that can be performed in accordance with one embodiment to control a computing device, such as the wearable computing device 20 of FIGS. 1-4, in response to detecting or identifying an activity engaged in by a user of the device. Generally, the processes of the method 200 can be implemented through hardware components and/or through executable instructions stored in some form of computer readable storage medium and executed by one or more processors or computing systems coupled to or otherwise in communication with the device. For example, the executable instructions can be stored on some form of non-transitory, tangible, computer-readable storage medium, such as magnetic or optical disk, or the like.

Illustratively, the device 20 of FIGS. 1-4 can implement the processes of the method 200. Alternatively or in conjunction, a network server or other device, which may be represented by the device 106 of FIG. 5, can implement the processes of the method 200 using FOV images and/or other sensor data obtained and transmitted by the device 20, for example. However, it should be understood that other computing systems and devices or combinations of computing systems and devices can implement the method 200, without departing from the scope of the present disclosure.

As shown in FIG. 8, at block 202, a device, such as the device 20 of FIGS. 1-4, displays a user interface viewable by a user. Such user interface may overlay a user's FOV of the physical world. At block 204, the device can obtain or receive images of the user's FOV. For example, the video camera 40 can be used to obtain such FOV images. At block 206, the device 20 and/or one or more other devices or servers can process the FOV images to determine an optical flow, for example, as discussed above.

The processing of the FOV images to determine, e.g., whether a wearer is operating a moving vehicle, may be performed as a background process, e.g., by periodically controlling a camera to capture a sequence of images or a video of a certain length and processing the images or video to determine the optical flow. Alternatively, a background process may continually analyze the optical flow of FOV images to detect when a wearer is operating a vehicle or engaged in some other activity.

In another example, the FOV images can be processed in response to detecting some sort of triggering condition. Illustratively, a FOV image can be captured and processed using object recognition techniques to determine that a user is positioned in a car. In response to the triggering condition of determining that the user is in a car, images or video can be captured or otherwise processed to determine optical flow. Another example of a triggering condition may include an input from the user to perform the processing. As another example, the process may be initiated in response to a manual input, such as a voice command or touchpad gesture, for instance.

Block 208 can also be executed by the device 20 and/or one or more other devices or servers to obtain data from one or more sensors. Such sensors may include, for example, one or more of an accelerometer, a compass, a gyroscope, a GPS sensor, a gaze tracking sensor, heart rate and/or blood pressure monitors, a galvanic skin response sensor, etc.

Referring to block 210, the device 20 and/or one or more other devices or servers can utilize one or more of the optical flow and the sensor data to identify a user activity and/or a sub-state of a user activity. As discussed generally above, such activity or sub-state thereof may include the user operating a vehicle. In other examples, other user activities and sub-states thereof can be identified.

In FIG. 8, block 212 can be executed to control the device in response to the identified activity or sub-state of an activity. For example, the device can adjust the displayed user interface in accordance with an identified activity. Alternatively or in conjunction, the device can adjust communication settings and/or internet settings in accordance with an identified activity. Illustratively, if a user is operating a vehicle, the display can modify the user interface to be generally transparent, minimized in content or detail, or removed entirely. In other examples, other aspects of the device can be controlled in response to the identified activity.

FIG. 8 further illustrates an optional block 214, upon which one or more of the other functions of FIG. 8 may be conditioned. For example, at block 214, the device 20 determines that the wearable computing device is being worn and used by a user (e.g., worn over the eyes of the user as opposed to being worn around the neck of the user or being propped up on the head of the user). The performance of an example method may then be conditioned upon the wearable computing device being worn.

For example, while the wearable computing device is powered on, a movement or position sensor, such as a gyroscope, accelerometer, compass, GPS sensor, etc., can be utilized to detect positioning or movement of the wearable computing device that is characteristics of being worn over the eyes of a user. Such characteristic movement may include periodic movements in multiple directions consistent with being worn on a head of the user. Further, characteristic positioning of the wearable computing device consistent with being worn over the eyes of the user may include being positioned generally parallel with the horizon. In contrast, a completely stationary wearable computing device may be characteristic of a device that is not being worn by a user. However, a wearable computing device that is moving, such as in only one relative direction, may also be characteristic of a device that is not being worn but perhaps is placed in a storage compartment in a moving vehicle.

Alternatively or in conjunction, while the wearable computing device is powered on, a camera associated with the device can capture FOV images and such FOV images can be processed to determine whether the images are consistent with a user's actual FOV or not. Generally, FOV images that are directed toward the horizon at eye-level may be consistent with a user's actual FOV and characteristic of a device that is being worn and used by the user. A non-limiting example of FOV images that are not characteristic of a device that is being worn over the eyes of the user, include multiple, consecutive images of an interior roof of a vehicle, which may be indicative of the wearable computing device being propped up on the head of the user.

In FIG. 8, the processes of block 214 are illustrated as being performed prior to block 206, which is only one non-limiting example arrangement to reduce power consumption in cases where the optical flow processing need not be executed. In other examples, the processes of block 214 can be performed as a precondition to other blocks, such as before the processes of block 202. Further, in another example, the processes of block 214 can be performed periodically and concurrently with other processes illustrated and described in relation to the method 200. In this example, if it is determined at block 214 that the device is not being worn or used by the user, then the processes of the other blocks in FIG. 8 can be suspended.

Since many modifications, variations, and changes in detail can be made to the described examples, it is intended that all matters in the preceding description and shown in the accompanying figures be interpreted as illustrative and not in a limiting sense. Further, it is intended to be understood that the following clause(s) further describe aspects of the present description.

V. Conclusion

Where example embodiments involve information related to a person or a device used by a person, the embodiments should be understood to include privacy controls. Such privacy controls include, at least, anonymization of device identifiers, transparency, and user controls, including functionality that would enable users to modify or delete information relating to the user's use of the device.

Further, in embodiments where a computing device can collect information about a user of the device or other persons, or may make use of personal information, the user may be provided with an opportunity to control whether programs or features collect user information (e.g., image data about a user's environment or records of the user's activities or locations). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A computing device comprising:
   a camera configured to capture image data indicative of a wearer field-of-view associated with a wearable computing device when worn; and
   a computing system configured to:
      determine optical flow from the image data;
      determine, based on the optical flow, that the wearable computing device is associated with movement of a vehicle;
      responsive to the determination that the wearable computing device is associated with movement of the vehicle:
         detect, from the image data, one or more objects in the wearer field-of-view that are indicative of an operator location in the vehicle;
         detect gaze data from a gaze tracking sensor that is indicative of focus on a side-view mirror, a rear-view mirror, a speedometer, or other operator-side instrument of the vehicle;
         determine, based at least in part on the detection of the one or more objects in the wearer field-of-view and the detection of gaze data indicative of focus on the side-view mirror, the rear-view mirror, the speedometer, or the other operator-side instrument of the vehicle, that the wearable computing device is positioned at the operator location in the vehicle;
         control a display to display information in a first mode, when the wearable computing device is associated with the operation of the vehicle; and
         control the display to display information in a second mode different from the first mode, when the wearable computing device is not associated with the operation of the vehicle.

2. The computing device of claim 1, wherein the computing system is configured to determine from the optical flow that the wearable computing device is associated with operation of the vehicle by determining that one or more of foreground pixels or background pixels of the image data are moving toward the camera at a rate of speed consistent with being inside a moving vehicle.

3. The computing device of claim 1, wherein the first mode provides a less obstructed display of information than the second mode.

4. The computing device of claim 1, wherein the first mode provides navigational information.

5. The computing device of claim 1, further comprising the one or more sensors, wherein the one or more sensors include one or more of an accelerometer, a gyroscope, a compass, or a global positioning system sensor, and wherein the computing system is configured to determine, based on an output from one or more sensors, that the wearable computing device is positioned at the operator location in the vehicle as opposed to the passenger location in the vehicle.

6. The computing device of claim 1, wherein the computing system is configured to control the wearable computing device in response to the determination that the wearable computing device is associated with operation of the vehicle by modifying communication settings of the wearable computing device, wherein the communication settings include one or more of text messaging settings, phone call settings, or internet settings.

7. The computing device of claim 1, wherein the computing system is configured to determine optical flow from the image data by compensating for optical flow contributions caused by rotation of the camera.

8. A computer-implemented method comprising:
receiving image data that is associated with a wearable computing device, wherein the wearable computing device is operatively coupled to a camera, and wherein the camera captures the image data;
processing the image data to determine optical flow;
determining, based on the optical flow, that the wearable computing device is associated with movement of a vehicle; and
responsive to the determination that the wearable computing device is associated with movement of the vehicle:
detecting, in the image data, one or more objects in a wearer field-of-view that are indicative of an operator location in the vehicle;
detecting gaze data from a gaze tracking sensor that is indicative of focus on a side-view mirror, a rear-view mirror, a speedometer, or another operator-oriented instrument of the vehicle; and
determining, based at least in part on the detection of the one or more objects in the wearer field-of-view and the detection of gaze data indicative of periodic focus on the side-view mirror, the rear-view mirror, the speedometer, or the other operator-side instrument of the vehicle, that the wearable computing device is positioned at the operator location in the vehicle as opposed to a passenger location in the vehicle;
identifying an activity based on the optical flow and the position of the wearable computing device in the vehicle, wherein the activity is associated with operation of the vehicle; and
controlling the wearable computing device in response to the identified activity, wherein controlling the wearable computing device includes adjusting information displayed by the wearable computing device.

9. The method of claim 8, further comprising:
identifying, using the optical flow, a sub-state of the activity; and
controlling the wearable computing device in response to the identified sub-state,
and wherein the identified sub-state includes a sub-state of the operation of the vehicle.

10. The method of claim 8, wherein the determination that the wearable computing device is associated with movement of the vehicle is further based on sensor data captured by one or more of an accelerometer, a gyroscope, a compass, or a global positioning system sensor.

11. The method of claim 8, wherein processing the image data to determine the optical flow includes compensating for optical flow contributions caused by rotation of the camera.

12. The method of claim 8, further comprising controlling the wearable computing device in response to the identified activity by modifying communication settings of the wearable computing device, wherein the communication settings include one or more of text messaging settings, phone call settings, or internet settings.

13. A wearable computing device comprising:
a display;
an imaging device; and
a computing system coupled to the display and the imaging device, wherein the computing system is configured to:
determine optical flow by processing image data captured by the imaging device,
determine, based on the optical flow, that the wearable computing device is associated with movement of a vehicle; and
responsive to the determination that the wearable computing device is associated with movement of the vehicle:
detect, from the image data, one or more objects in a wearer field-of-view that are indicative of an operator location in the vehicle;
detect gaze data from a gaze tracking sensor that is indicative of periodic focus on a side-view mirror, a rear-view mirror, a speedometer, or other operator-side instrument of the vehicle;
determine, based at least in part on the detection of the one or more objects in the wearer field-of-view and the detection of gaze data indicative of periodic focus on the side-view mirror, the rear-view mirror, the speedometer, or the other operator-side instrument of the vehicle, that the imaging device is positioned at the operator location in the vehicle as opposed to a passenger location in the vehicle,
identify an activity based on the optical flow and the position of the imaging device in the vehicle, wherein the activity is associated with operation of the vehicle, and
control the display to display information in response to the identified activity.

14. The wearable computing device of claim 13, wherein the computing system is further configured to measure rotation of the imaging device, and to determine the optical flow by processing the image data and by compensating for optical flow contributions caused by the measured rotation of the imaging device.

15. The wearable computing device of claim 14, wherein the computing system being configured to determine optical flow by compensating for optical flow contributions caused by the measured rotation of the imaging device further includes the computing system being configured to:
- measure a rotational angular velocity of the imaging device,
- model a predicted optical flow contribution based on the measured rotational angular velocity, and
- removing the predicted optical flow contribution from an optical flow field using a vector sum of a calculated optical flow field and an anticipated optical flow field.

16. The wearable computing device of claim 14, wherein the computing system being configured to determine optical flow by compensating for optical flow contributions caused by the measured rotation of the imaging device further includes the computing system being configured to:
- determine if the measured rotation of the imaging device exceeds a given threshold, and
- based on the measured rotation of the imaging device exceeding the given threshold, suspending the processing of the image data to determine the optical flow.

17. The wearable computing device of claim 13, further comprising one or more sensors, wherein the one or more sensors include one or more of an accelerometer, a gyroscope, a compass, a gaze tracking sensor, or a global positioning system sensor, and wherein the computing system is configured to identify, based on an output from one or more of the accelerometer, the gyroscope, the compass, the gaze tracking sensor, or the global positioning system sensor, that the imaging device is positioned at the operator location in the vehicle as opposed to the passenger location in the vehicle.

* * * * *